United States Patent
Nagaoka et al.

(10) Patent No.: US 9,051,859 B2
(45) Date of Patent: Jun. 9, 2015

(54) EXHAUST GAS PURIFICATION DEVICE AND CONTROL METHOD FOR EXHAUST GAS PURIFICATION DEVICE

(75) Inventors: Daiji Nagaoka, Fujisawa (JP); Teruo Nakada, Fujisawa (JP); Hiroyuki Yuza, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 96 days.

(21) Appl. No.: 13/640,802

(22) PCT Filed: Apr. 13, 2011

(86) PCT No.: PCT/JP2011/059152
§ 371 (c)(1),
(2), (4) Date: Oct. 12, 2012

(87) PCT Pub. No.: WO2011/129358
PCT Pub. Date: Oct. 20, 2011

(65) Prior Publication Data
US 2013/0031892 A1 Feb. 7, 2013

(30) Foreign Application Priority Data
Apr. 15, 2010 (JP) ................................. 2010-094337

(51) Int. Cl.
*F01N 3/20* (2006.01)
*F01N 3/035* (2006.01)
(Continued)

(52) U.S. Cl.
CPC ................ *F01N 3/035* (2013.01); *B01D 53/30* (2013.01); *B01D 53/9409* (2013.01);
(Continued)

(58) Field of Classification Search
CPC F01N 2560/026; F02D 41/146; F02D 41/222

USPC ............................ 60/276, 286, 295, 297, 303
See application file for complete search history.

(56) References Cited

U.S. PATENT DOCUMENTS

2009/0229253 A1* 9/2009 Shibata et al. .................. 60/277
2010/0101210 A1* 4/2010 Eckhoff et al. ................. 60/274
2011/0252767 A1* 10/2011 Lin et al. ......................... 60/274

FOREIGN PATENT DOCUMENTS

JP 2000-018023 A 1/2000
JP 2007-162603 A 6/2007
(Continued)

OTHER PUBLICATIONS

PCT Search Report for PCT Serial No. PCT/JP2011/059152 dated Jun. 15, 2011.

*Primary Examiner* — Kenneth Bomberg
*Assistant Examiner* — Jonathan Matthias
(74) *Attorney, Agent, or Firm* — McCormick, Paulding & Huber LLP

(57) ABSTRACT

An exhaust gas purification device 1 includes an exhaust gas processing device 30 provided in an exhaust passage 11 of an internal combustion engine 10, an in-exhaust pipe fuel injection device 24 provided on an upstream side of the exhaust gas processing device 30 to supply fuel to the exhaust gas processing device 30, a NOx sensor 13 provided on a downstream side of the exhaust gas processing device 30, and a control unit 40 that controls combustion in the internal combustion engine 10 based on operating state of the engine 10. To burn and remove PM trapped in the exhaust gas processing device 30, the control unit 40 causes the in-exhaust pipe fuel injection device 24 to supply the fuel to the exhaust gas processing device 30 and stores a detection value from the NOx sensor 13 as a NOx value at an outlet of the engine 10.

12 Claims, 6 Drawing Sheets

(51) Int. Cl.
  *F01N 3/025* (2006.01)
  *F01N 3/08* (2006.01)
  *F01N 9/00* (2006.01)
  B01D 53/30 (2006.01)
  B01D 53/94 (2006.01)

(52) U.S. Cl.
  CPC ......... *B01D 53/944* (2013.01); *B01D 53/9477* (2013.01); *B01D 53/9495* (2013.01); *F01N 3/0253* (2013.01); *F01N 3/0821* (2013.01); *F01N 3/2066* (2013.01); *F01N 9/002* (2013.01); *F01N 9/005* (2013.01); *F01N 2560/026* (2013.01); *F01N 2560/06* (2013.01); *F01N 2610/02* (2013.01); *F01N 2610/03* (2013.01); *Y02C 20/10* (2013.01); *Y02T 10/47* (2013.01); *Y02T 10/24* (2013.01)

(56) References Cited

FOREIGN PATENT DOCUMENTS

| | | |
|---|---|---|
| JP | 2009-197741 A | 9/2009 |
| WO | 2008/092691 A1 | 8/2008 |

\* cited by examiner

EXHAUST GAS PURIFICATION DEVICE AND CONTROL METHOD FOR EXHAUST GAS PURIFICATION DEVICE

CROSS REFERENCE TO RELATED APPLICATIONS

This application is entitled to the benefit of and incorporates by reference essential subject matter disclosed in International Patent Application No. PCT/JP2011/059152 filed on Apr. 13, 2011 and Japanese Patent Application No. 2010-94337 filed Apr. 15, 2010.

TECHNICAL FIELD

The present invention relates to an exhaust gas purification device that includes an exhaust gas processing device provided in an exhaust passage of an internal combustion engine and a NOx sensor provided on a downstream side of the exhaust gas processing device, and a control method for the exhaust gas purification device.

BACKGROUND ART

Predicting a NOx value (to be referred to hereafter as an engine outlet NOx value) of exhaust gas discharged from an internal combustion engine such as a diesel engine is an important element in control of an exhaust gas processing device having a NOx catalyst such as an LNT occlusion reduction catalyst or an SCR selective reduction catalyst. The engine outlet NOx value deteriorates due to various factors such as an operating state of the engine and catalyst deterioration, and therefore, during authentication tests performed in respective countries, the engine outlet NOx value is evaluated by multiplying an initial exhaust gas value by a deterioration coefficient, taking these factors into account. The engine outlet NOx value may be measured precisely by providing a NOx sensor on an upstream side of the exhaust gas processing device so that the engine outlet NOx value is detected directly, but in terms of cost limitations, durability, and the need to apply OBD (failure diagnosis), the NOx sensor is preferably provided on a downstream side of the exhaust gas processing device.

In a case where the NOx value of the exhaust gas is detected by providing the NOx sensor on the downstream side of the exhaust gas processing device, the engine outlet NOx value is predicted by detecting a NOx value (to be referred to hereafter as a catalyst outlet NOx value) of the exhaust gas following passage thereof through the exhaust gas processing device.

This type of exhaust gas purification system, Japanese Patent Application Publication No. 2000-18023, for example, discloses an exhaust gas purification system having a diagnosis function for diagnosing a degree of deterioration in a NOx occlusion catalyst on the basis of detection values of NOx sensors provided on the upstream side and the downstream side of an exhaust gas processing device.

DISCLOSURE OF THE INVENTION

Incidentally, in an exhaust gas processing device having an LNT occlusion reduction catalyst, an SCR selective reduction catalyst, or the like, the engine outlet NOx value takes a larger value than the catalyst output NOx value when a NOx purification capacity of the NOx catalyst is functional (i.e. when NOx is occluded by the LNT occlusion reduction catalyst or when NOx is reduced by $NH_3$ in the SCR selective reduction catalyst). Hence, in a case where the NOx sensor is provided on the downstream side of the exhaust gas processing device, the engine outlet NOx value must be predicted by detecting the catalyst outlet NOx value in a state where the NOx purification capacity of the NOx catalyst is not functional.

However, states in which the NOx purification capacity of the NOx catalyst is not functional are limited, and when an attempt is made to create this state intentionally, a Ki value (a value obtained by reflecting the degree of deterioration in the exhaust gas due to PM regeneration and the like in the deterioration coefficient of the catalyst) may deteriorate, making condition selection difficult. Examples of methods for intentionally creating a state in which the purification capacity of the NOx catalyst is not functional include not performing rich NOx reduction in the LNT occlusion reduction catalyst and not performing urea water injection so that $NH_3$ selective NOx reduction is not performed in the SCR selective reduction catalyst. However, intentionally creating this state is undesirable since it causes the Ki value to deteriorate.

The NOx purification capacity of the NOx catalyst is also not functional when an exhaust gas temperature is low, but this condition is only satisfied immediately after engine startup and during a low load operation such as an idle operation. Immediately after engine startup, EGR and fuel injection are performed at different timings to a normal operation, and it is therefore not effective to predict the engine outlet NOx value in this state. Further, during an idle operation, the engine outlet NOx value is itself low, and therefore the likelihood of an error increases when the engine outlet NOx value is predicted in this state.

The present invention has been designed in consideration of these problems, and an object thereof is to provide an exhaust gas purification device and a control method thereof with which an engine outlet NOx value can be measured effectively by means of a simple configuration and without causing a Ki value (a value obtained by reflecting a degree of exhaust gas deterioration due to PM regeneration and the like in a deterioration coefficient of a catalyst) to deteriorate using a NOx sensor provided on a downstream side of an exhaust gas processing device.

To achieve the object described above, an exhaust gas purification device according to the present invention includes an exhaust gas processing device provided in an exhaust passage of an internal combustion engine; in-exhaust pipe fuel injecting means provided in the exhaust passage on an upstream side of the exhaust gas processing device in order to supply fuel to the exhaust gas processing device; NOx detecting means provided on a downstream side of the exhaust gas processing device; and a control unit that controls combustion in the internal combustion engine on the basis of an operating state of the internal combustion engine, wherein, in order to burn and remove PM trapped in the exhaust gas processing device, the control unit causes the in-exhaust pipe fuel injecting means to supply the fuel to the exhaust gas processing device and stores a detection value from the NOx detecting means as a NOx value at an outlet of the internal combustion engine.

Further, the exhaust gas processing device may include temperature detecting means for detecting a temperature in the exhaust gas processing device, and in order to burn and remove the PM trapped in the exhaust gas processing device, the control unit may store the detection value from the NOx detecting means as the NOx value at the outlet of the internal combustion engine when a fixed time has elapsed, an amount of variation in a temperature detection value from the temperature detecting means has remained at or below a predetermined value continuously for the fixed time, and an amount of variation in the detection value from the NOx detecting means has remained at or below a predetermined value continuously for the fixed time after the fuel has been supplied to the exhaust gas processing device from the in-exhaust pipe fuel injecting means.

Further, the control unit may include a map illustrating a fuel injection amount to be injected relative to a NOx value generated in accordance with the operating state of the internal combustion engine, and the control unit may correct the NOx value on the map on the basis of a difference between the NOx value on the map and the detection value from the NOx detecting means stored as the NOx value at the outlet of the internal combustion engine.

Further, the exhaust gas processing device may include an oxidation catalyst, an LNT occlusion reduction catalyst, and a DPF.

Further, the exhaust gas processing device may include an oxidation catalyst, an SCR selective reduction catalyst, a DPF, and reducing agent injecting means for supplying urea water as a reducing agent may be provided on an upstream side of the SCR selective reduction catalyst.

Furthermore, to achieve the object described above, in a control method for an exhaust gas purification device according to the present invention, the exhaust gas purification device includes an exhaust gas processing device provided in an exhaust passage of an internal combustion engine; in-exhaust pipe fuel injecting means provided in the exhaust passage on an upstream side of the exhaust gas processing device in order to supply fuel to the exhaust gas processing device; NOx detecting means provided on a downstream side of the exhaust gas processing device; and a control unit that controls combustion in the internal combustion engine on the basis of an operating state of the internal combustion engine, and in order to burn and remove PM trapped in the exhaust gas processing device, wherein the control unit causes the in-exhaust pipe fuel injecting means to supply the fuel to the exhaust gas processing device and stores a detection value from the NOx detecting means as a NOx value at an outlet of the internal combustion engine.

Further, the exhaust gas processing device may include temperature detecting means for detecting a temperature in the exhaust gas processing device, and in order to burn and remove the PM trapped in the exhaust gas processing device, the control unit may store the detection value from the NOx detecting means as the NOx value at the outlet of the internal combustion engine when a fixed time has elapsed, an amount of variation in a temperature detection value from the temperature detecting means has remained at or below a predetermined value continuously for the fixed time, and an amount of variation in the detection value from the NOx detecting means has remained at or below a predetermined value continuously for the fixed time after the fuel has been supplied to the exhaust gas processing device from the in-exhaust pipe fuel injecting means.

Further, the control unit may include a map illustrating a fuel injection amount to be injected relative to a NOx value generated in accordance with the operating state of the internal combustion engine, and the control unit may correct the NOx value on the map on the basis of a difference between the NOx value on the map and the detection value from the NOx detecting means stored as the NOx value at the outlet of the internal combustion engine.

Further, the exhaust gas processing device may include an oxidation catalyst, an LNT occlusion reduction catalyst, and a DPF.

Further, the exhaust gas processing device may include an oxidation catalyst, an SCR selective reduction catalyst, and a DPF, and reducing agent injecting means for supplying urea water as a reducing agent may be provided on an upstream side of the SCR selective reduction catalyst.

With the exhaust gas purification device and the control method thereof according to the present invention, an engine outlet NOx value can be measured effectively by means of a simple configuration and without causing a Ki value (a value obtained by reflecting a degree of exhaust gas deterioration due to PM regeneration and the like in a deterioration coefficient of a catalyst) to deteriorate using a NOx sensor provided on a downstream side of an exhaust gas processing device.

BEST MODES FOR CARRYING OUT THE INVENTION

Figure 1:
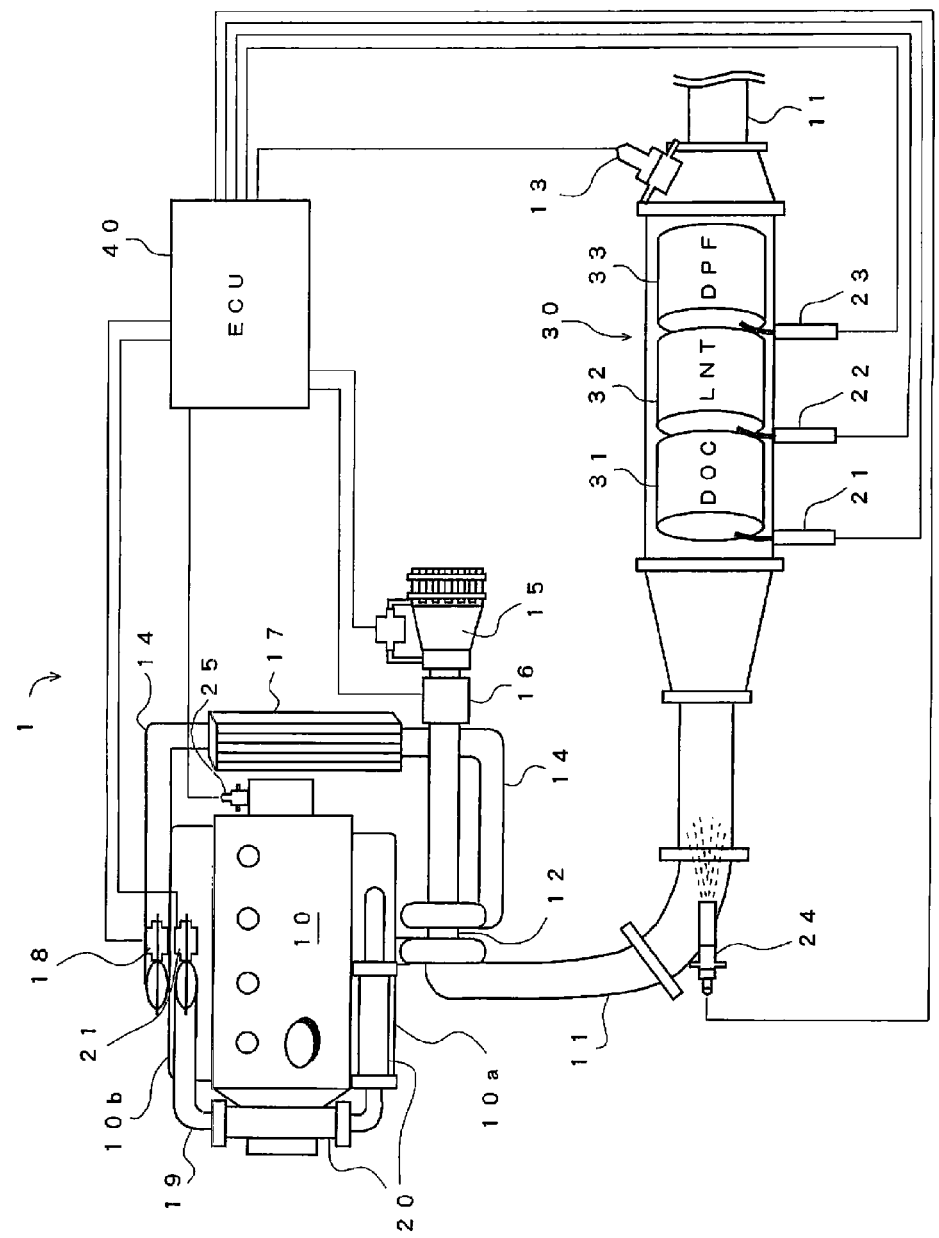
FIG. 1 is a schematic view of an exhaust gas purification device according to an embodiment of the present invention.

An embodiment of the present invention will be described below with reference to the drawings.

FIGS. 1 to 6 illustrate an exhaust gas purification device according to this embodiment of the present invention. Identical components have been allocated identical reference numerals and have identical names and functions. Accordingly, detailed description of these components will not be repeated.

As shown in FIG. 1, a diesel engine (internal combustion engine) 10 is provided with an intake manifold 10b and an exhaust manifold 10a. Further, an intake passage 14 into which fresh air (intake air) is introduced by opening an intake value (not shown) provided in the diesel engine 10 is connected to the intake manifold 10b, and an exhaust passage 11 into which exhaust gas is discharged by opening an exhaust valve (not shown) is connected to the exhaust manifold 10a. An intake throttle 18, an intercooler 17, a turbocharger 12, and a mass air flow sensor 16 are interposed on an upstream side of the intake passage 14, and an air filter 15 is provided on a tip end of the intake passage 14. The intake manifold 10b and the exhaust manifold 10a are connected by an EGR passage 19, and an EGR cooler 20 and an EGR valve 21 are provided in the EGR passage 19.

An exhaust gas processing device 30 to be described in detail below is provided on a downstream side of the exhaust passage 11, and an in-exhaust pipe fuel injection device (in-exhaust pipe fuel injecting means) 24 for injecting fuel (HC) directly is provided on an upstream side thereof. More specifically, during control to raise a temperature of a DOC (oxidation catalyst) 31 provided in the exhaust gas processing device 30, forcible regeneration control for restoring a NOx occlusion capacity of an LNT occlusion reduction catalyst 32, PM forcible regeneration control for forcibly burning and removing particulate matter (to be referred to as PM hereafter) trapped in a DPF (diesel particulate filter) 33, and so on, the in-exhaust pipe fuel injection device 24 injects unburned fuel (HC) directly into the exhaust passage 11 so that the injected fuel is supplied to the exhaust gas processing device 30 on the downstream side thereof.

As shown in FIG. 1, the exhaust gas processing device 30 includes, in order from the upstream side, the DOC 31, the LNT occlusion reduction catalyst 32, and the DPF 33. Further, to measure respective temperatures of the catalyst and the filters 31, 32, and 33 constituting the exhaust gas processing device 30, the exhaust gas processing device 30 is provided with a first temperature sensor 21 on an upstream side of the DOC 31, a second temperature sensor (temperature detecting means) 22 between the DOC 31 and the LNT occlusion reduction catalyst 32, and a third temperature sensor 23 between the LNT occlusion reduction catalyst 32 and the DPF 33. Furthermore, a NOx sensor (NOx detecting means) 13 that detects a NOx value (catalyst outlet NOx value) of exhaust gas after passing through the exhaust gas processing device 30 is provided in the exhaust passage 11 on a downstream side of the DPF 33. Note that here, the NOx value is a value obtained by multiplying a NOx concentration value by an exhaust gas flow per unit time.

The DOC 31 has a conventional structure in which an oxidation catalyst is carried on a surface of a ceramic carrier such as a cordierite honeycomb structure. When unburned fuel such as HC (hydrocarbon) and CO (carbon monoxide) exists in the exhaust gas, the DOC 31 oxidizes the unburned fuel. The temperature of the exhaust gas is increased by heat generated during oxidation, leading to an increase in the respective temperatures of the LNT occlusion reduction catalyst 32 and the DPF 33 on the downstream side thereof.

The LNT occlusion reduction catalyst 32 has a conventional structure in which the NOx in the exhaust gas is occluded when an air-fuel ratio of the exhaust gas is lean and the NOx is discharged when the air-fuel ratio of the exhaust gas is rich such that the NOx is reduced by CO, HC, $H_2$, and so on in the exhaust gas. Further, the LNT occlusion reduction catalyst 32 is forcibly regenerated by a control ECU (control unit) 40 to be described below when a NOx occlusion capacity of the LNT occlusion reduction catalyst 32 is in a saturated state. More specifically, a map such as that shown in FIG. 3, which illustrates a NOx value (to be referred to hereafter as a map NOx value) generated by the diesel engine 10 using a rotation speed Ne and a fuel injection amount (or a load) Q as parameters, is stored in advance in the control ECU 40, and a NOx occlusion amount up to the present corresponding to the operating state (Ne, Q) of the diesel engine 10 is integrated on the basis of the map. When an integrated value of the NOx occlusion amount reaches or exceeds a predetermined value, the control ECU 40 determines that the NOx occlusion capacity of the LNT occlusion reduction catalyst 32 is in a saturated state, and executes forcible regeneration control on the LNT occlusion reduction catalyst 32 by outputting a control signal for causing the in-exhaust pipe fuel injection device 24 to inject an appropriate amount of fuel (HC).

The DPF 33 has a conventional structure in which PM in the exhaust gas is trapped in a filter, and when an amount of trapped PM reaches or exceeds a predetermined value, the PM accumulated in the filter is burned and removed. More specifically, when the in-exhaust pipe fuel injection device 24 is caused to inject unburned fuel (HC) directly into the exhaust passage 11 by a PM forcible regeneration control unit 42 of the control ECU 40, to be described below, the temperature of the DOC 31 increases, and as a result, the accumulated PM is burned by the increased-temperature exhaust gas. An amount of fuel injected by the in-exhaust pipe fuel injection device 24 during the PM forcible regeneration control is controlled by the control ECU 40 such that a measured temperature (the temperature of the DPF 33) obtained by the third temperature sensor 23 remains within a PM forcible combustion temperature range (550° C. to 600° C.).

Note that when the temperature of the DPF 33 reaches or exceeds 550° C., the temperature of the upstream side LNT occlusion reduction catalyst 32 likewise increases to or above 550° C. However, in a temperature region at or above 550° C., the NOx occlusion capacity of the LNT occlusion reduction catalyst 32 does not function. In other words, a NOx value (engine outlet NOx value) on the upstream side of the exhaust gas processing device 30 and the NOx value (catalyst outlet NOx value) on the downstream side of the exhaust gas processing device 30 are substantially equal.

Figure 2:
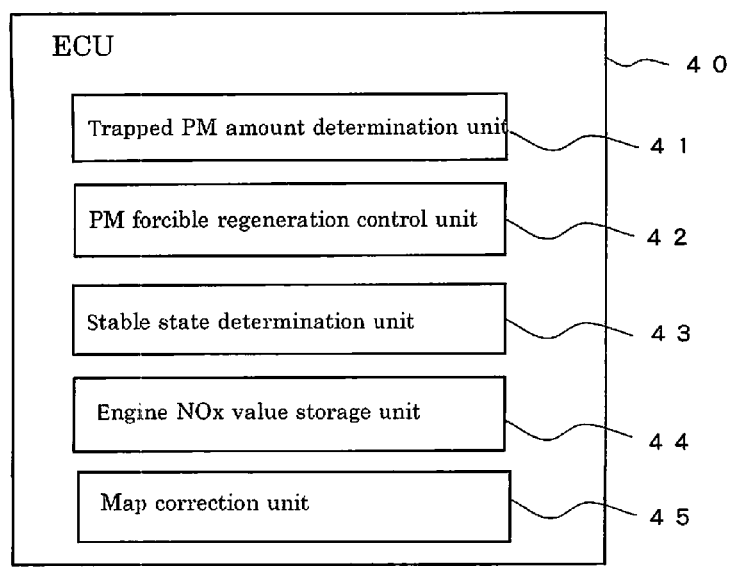
FIG. 2 is a block diagram showing a control ECU of the exhaust gas purification device according to this embodiment of the present invention.

Next, based on FIGS. 1 and 2, the control ECU 40 according to this embodiment of the present invention will be described. The control ECU 40 according to this embodiment performs basic control such as injection control and fuel injection timing control on the diesel engine 10, and is constituted by conventional components such as a CPU and a ROM. Further, as shown in FIG. 2, the control ECU 40 includes, as a part of the functional elements thereof, a trapped PM amount determination unit 41, the PM forcible regeneration control unit 42, a stable state determination unit 43, an engine NOx value storage unit 44, and a map correction unit 45. In this embodiment, these functional elements are included in the control ECU 40 as integrated hardware, but any part thereof may be provided as separate hardware.

The trapped PM amount determination unit 41 estimates a trapped PM amount trapped in the DPF 33, and determines whether or not the estimated trapped PM amount exceeds an allowable value. More specifically, pressure sensors, not shown in the drawings, are provided respectively in an upstream portion and a downstream portion of the DPF 33, and the determination is performed on the basis of a differential pressure between the two pressure sensors. When this differential pressure equals or exceeds a predetermined value, the trapped PM amount determination unit 41 determines that the trapped PM amount trapped in the DPF 33 has exceeded the allowable value.

When the trapped PM amount determination unit 41 determines that the trapped PM amount has exceeded the allowable value of the DPF 33, the PM forcible regeneration control unit 42 executes PM forcible regeneration control to burn and remove the trapped PM. More specifically, the measured temperature obtained by the third temperature sensor 23 is output to the PM forcible regeneration control unit 42, whereupon the PM forcible regeneration control unit 42 raises the temperature of the DOC 31 by causing the in-exhaust pipe fuel injection device 24 to inject an appropriate amount of fuel through conventional feedback control until the measured temperature is within a range of 550° C. to 600° C.

The stable state determination unit 43 determines whether or not the LNT occlusion reduction catalyst 32 is in a stable state when a fixed time (three to four minutes, for example) has elapsed following the start of the PM forcible regeneration control by the PM forcible regeneration control unit 42. More specifically, a measured temperature obtained by the second temperature sensor 22 is output to the stable state determination unit 43, and when an amount of variation in the measured temperature has remained at or below a predetermined value continuously for the fixed time, the stable state determination unit 43 determines that a catalyst temperature of the LNT occlusion reduction catalyst 32 is in a stable state. Further, a detection value obtained by the NOx sensor 13 is output to the stable state determination unit 43, and when an amount of variation in the detection value has remained at or below a predetermined value continuously for the fixed time, the stable state determination unit 43 determines that a NOx outflow value of the LNT occlusion reduction catalyst 32 is in a stable state, i.e. that the NOx occlusion capacity of the LNT occlusion reduction catalyst 32 is substantially not functional. In other words, the stable state determination unit 43 determines that the LNT occlusion reduction catalyst 32 is in a stable state when the catalyst temperature of the LNT occlusion reduction catalyst 32 is stable and the NOx outflow value of the LNT occlusion reduction catalyst 32 is stable following the elapse of the fixed time from the PM forcible regeneration control.

When the stable state determination unit 43 determines that the LNT occlusion reduction catalyst 32 is in a stable state following the start of the PM forcible regeneration control, the engine NOx value storage unit 44 stores a catalyst outlet NOx value $\alpha_1$ detected by the NOx sensor 13 as the engine outlet NOx value generated by the diesel engine 10.

The map correction unit 45 reads a map NOx value (initial value) $\alpha_0$ corresponding to the operating state of the diesel engine 10 from the map (FIG. 3) on the basis of an output value (rotation speed) Ne of an engine rotation sensor 25 detected upon storage of the catalyst outlet NOx value $\alpha_1$ as the engine outlet NOx value, and an output value (fuel injection amount) Q of an accelerator opening sensor (not shown). The map correction unit 45 then calculates a difference (learned value) $\beta$ between the map NOx value (initial value) $\alpha_0$ and the catalyst outlet NOx value $\alpha_1$ and corrects the map (FIG. 3) on the basis of a correction amount (FF value) corresponding to the difference (learned value) $\beta$. More specifically, when the difference (learned value) $\beta$ obtained by subtracting the catalyst outlet NOx value $\alpha_1$ from the map NOx value (initial value) $\alpha_0$ takes a negative (minus) value, a value obtained by subtracting the difference (learned value) $\beta$ from the map NOx value (initial value) $\alpha_0$ is set as the correction amount (FF value). Further, when the difference (learned value) $\beta$ obtained by subtracting the catalyst outlet NOx value $\alpha_1$ from the map NOx value (initial value) $\alpha_0$ takes a positive (plus) value, a value obtained by adding the difference (learned value) $\beta$ to the map NOx value (initial value) $\beta_0$ is set as the correction amount (FF value). Note that correction of the map (FIG. 3) may be performed only when an absolute value of the difference (learned value) $\beta$ equals or exceeds a predetermined threshold. Further, the map (FIG. 3) may be corrected one point at a time whenever the PM forcible regeneration control is executed, or rewritten entirely on the basis of the corrected point.

Figure 4:
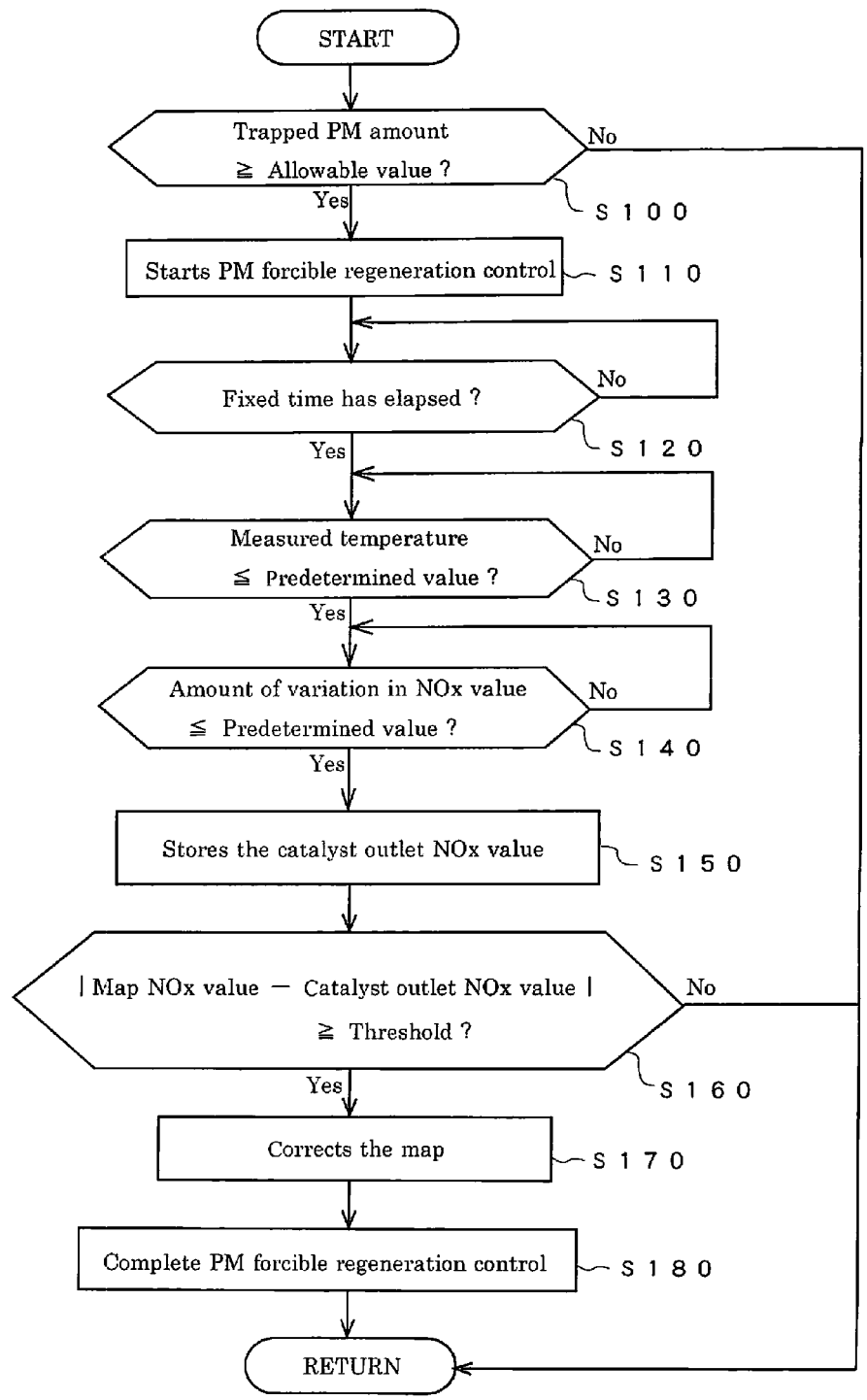
FIG. 4 is a flowchart showing control of the exhaust gas purification device according to this embodiment of the present invention.

In the exhaust gas purification device 10 according to this embodiment of the present invention, having the configuration described above, the following control is performed in accordance with a flowchart shown in FIG. 4, for example.

First, in Step (hereafter, Step will be abbreviated to S) 100, the trapped PM amount determination unit 41 estimates the trapped PM amount trapped in the DPF 33 on the basis of the differential pressure between the pressure sensors (not shown), and determines whether or not the estimated trapped PM amount exceeds the allowable value. When the differential pressure is large, or in other words when the trapped PM amount exceeds the allowable value, the control advances to S110. When, on the other hand, the differential pressure is small, or in other words the trapped PM amount does not exceed the allowable value, the control is returned.

In S110, the PM forcible regeneration control unit 42 starts PM forcible regeneration control by causing the in-exhaust pipe fuel injection device 24 to inject fuel in order to burn and remove the PM trapped in the DPF 33.

In S120, the stable state determination unit 43 determines whether or not the fixed time (three to four minutes, for example) has elapsed following the start of the PM forcible regeneration control in S110. When the fixed time has elapsed, the control advances to S130.

In S130, the stable state determination unit 43 reads the measured temperature obtained by the second temperature sensor 22 and determines whether or not the amount of variation in the measured temperature (an inlet portion temperature of the LNT occlusion reduction catalyst 32) has remained at or below the predetermined value continuously for the fixed time. When the amount of variation in the measured temperature has remained at or below the predetermined value continuously for the fixed time, the catalyst temperature of the LNT occlusion reduction catalyst 32 is determined to be in a stable state, whereupon the control advances to S140.

In S140, the stable state determination unit 43 reads the detection value of the NOx sensor 13 and determines whether or not the amount of variation in the detection value has remained at or below the predetermined value continuously for the fixed time. When the amount of variation in the detection value has remained at or below the predetermined value continuously for the fixed time, the NOx outflow value of the LNT occlusion reduction catalyst 32 is determined to be in a stable state, or in other words the NOx occlusion capacity of the LNT occlusion reduction catalyst 32 is determined to be substantially not functional, and therefore the control advances to S150.

In S150, the engine NOx value storage unit 44 stores the catalyst outlet NOx value $\alpha_1$ detected by the NOx sensor 13 as the engine outlet NOx value, whereupon the control advances to S160.

Figure 3:
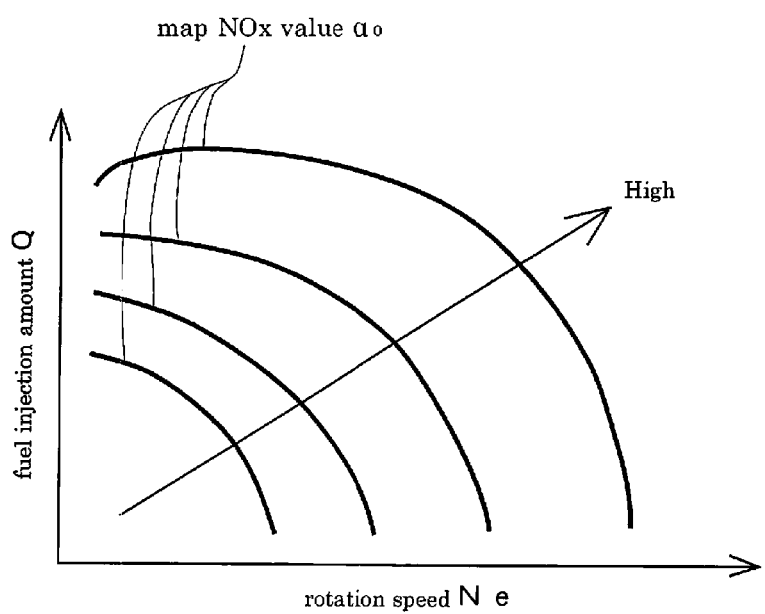
FIG. 3 is a map showing an engine operating state (Ne, Q) and a NOx value according to this embodiment of the present invention.

In S160, the map correction unit 45 calculates the difference (learned value) $\beta$ between the catalyst outlet NOx value $\alpha_1$ stored in S150 and the map NOx value (initial value) $\alpha_0$ read from the map (FIG. 3) on the basis of the operating state (the output values Ne, Q) upon storage of the catalyst outlet NOx value $\alpha_1$, and determines whether or not the absolute value of the difference $\beta$ equals or exceeds the predetermined threshold. When the absolute value of the difference (learned value) $\beta$ equals or exceeds the threshold, the control advances to S170 in order to correct the map (FIG. 3). When the absolute value of the difference $\beta$ is smaller than the threshold, on the other hand, it is determined that the map (FIG. 3) does not need to be corrected, and therefore the control is returned.

In S170, the map correction unit 45 corrects the map (FIG. 3) in accordance with the difference (learned value) $\beta$ calculated in S160. When the difference (learned value) $\beta$ takes a negative value, the map (FIG. 3) is corrected on the basis of a correction amount (FF value) obtained by subtracting the difference (learned value) $\beta$ from the map NOx value (initial value) $\alpha_0$. When the difference (learned value) $\beta$ takes a positive value, on the other hand, the map (FIG. 3) is corrected on the basis of a correction amount (FF value) obtained by adding the difference (learned value) $\beta$ to the map NOx value (initial value) $\alpha_0$.

Next, in S180, completion of the PM forcible regeneration control is confirmed, whereupon the control is returned.

By employing the configuration and the control described above, following actions and effects can be obtained with the exhaust gas purification device 1 and control method thereof according to this embodiment of the present invention.

The catalyst outlet NOx value $\alpha_1$ detected by the NOx sensor 13 provided on the downstream side of the exhaust gas processing device 30 is stored in the engine NOx value storage unit 44 as the engine outlet NOx value generated by the diesel engine 10 after the PM forcible regeneration control unit 42 starts the PM forcible regeneration control and the stable state determination unit 43 determines that the LNT occlusion reduction catalyst 32 is in a stable state.

Hence, there is no need to create a state in which the NOx purification capacity is not functional (a state in which rich NOx reduction is not performed by the LNT occlusion reduction catalyst 32 or the like) intentionally in order to measure the engine outlet NOx value, and the engine outlet NOx value can be measured by the NOx sensor 13 provided on the downstream side of the exhaust gas processing device 30 while making effective use of the time during which PM forcible regeneration is executed on the DPF 33. As a result, the engine outlet NOx value can be measured precisely without causing the Ki value to deteriorate.

Figure 5:
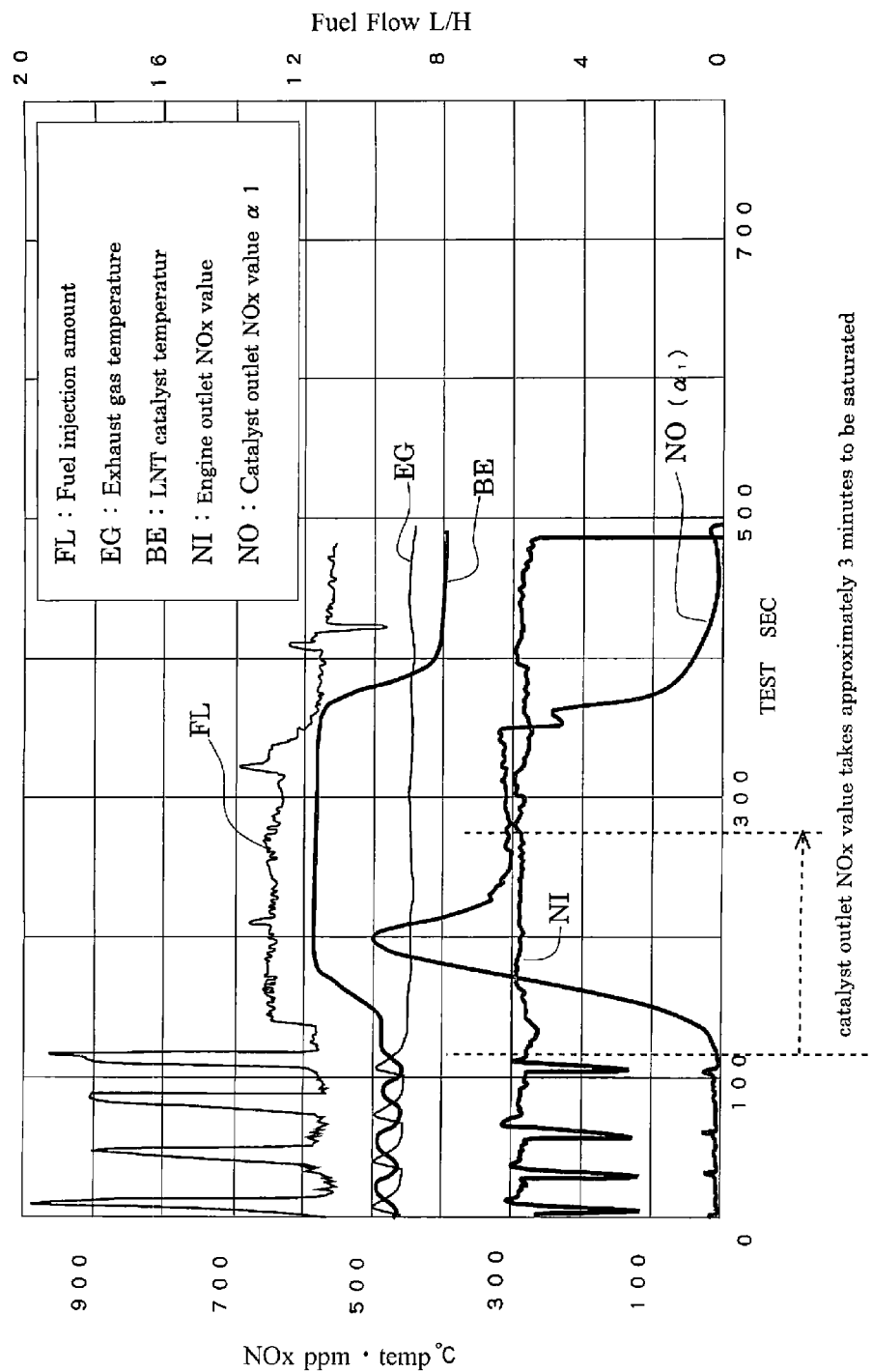
FIG. 5 is a view showing temporal variation in a catalyst outlet NOx value when PM forcible regeneration control is implemented in the exhaust gas purification device according to this embodiment of the present invention.
Figure 6:
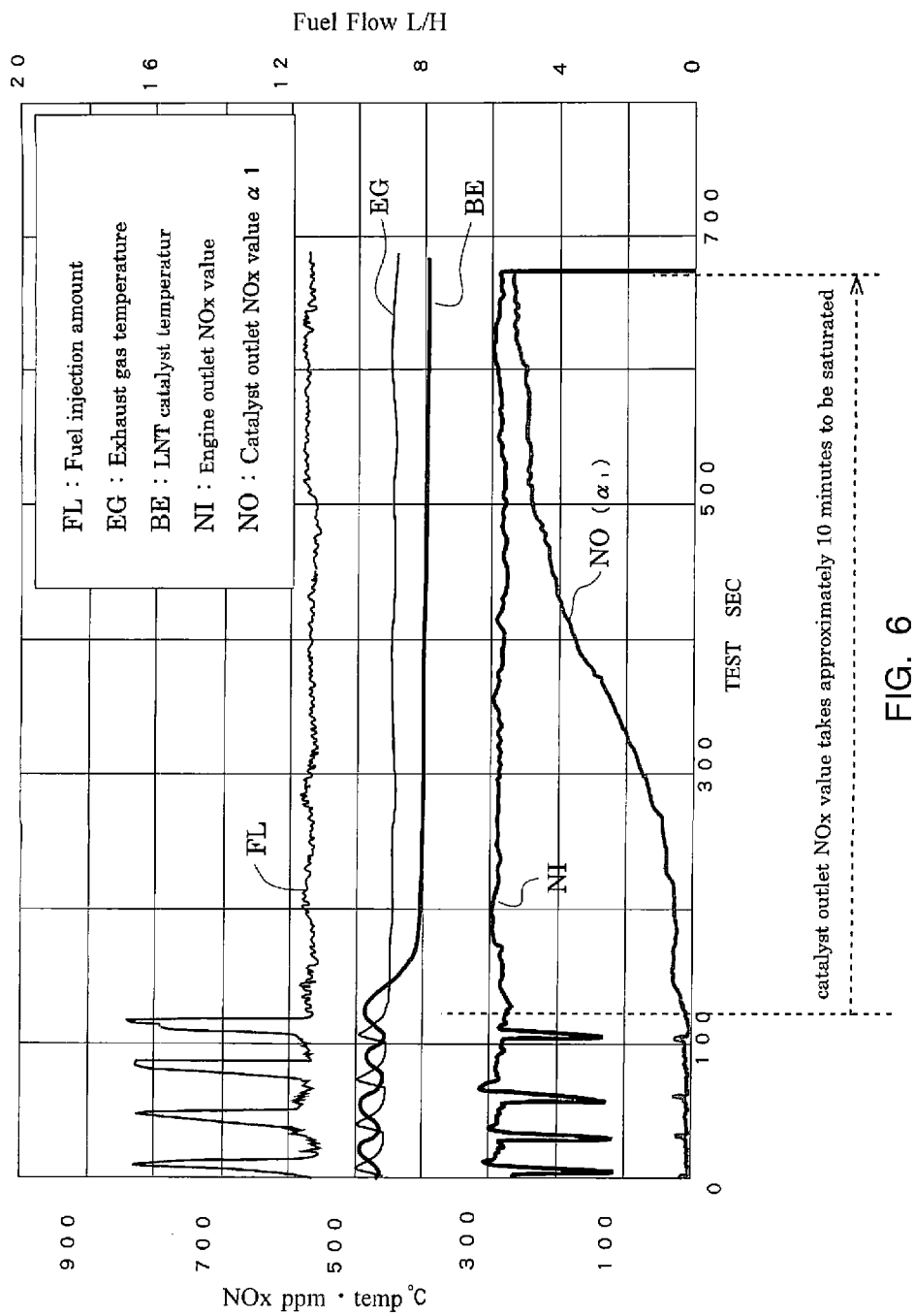
FIG. 6 is a view showing temporal variation in the catalyst outlet NOx value when PM forcible regeneration control is not implemented in the exhaust gas purification device according to this embodiment of the present invention.

FIGS. 5 and 6 show temporal variation in the catalyst outlet NOx value until the catalyst outlet NOx value substantially equals the engine outlet NOx value in a case where the PM forcible regeneration control is implemented and, as a comparative example, a case where the PM forcible regeneration control is not implemented in the exhaust gas purification device 1 according to this embodiment. FIG. 5 shows a case in which the PM forcible regeneration control is implemented, and FIG. 6 shows a case in which the PM forcible regeneration control is not implemented. As shown in FIG. 6, when the PM forcible regeneration control is not implemented, the catalyst outlet NOx value $\alpha_1$ takes approximately ten (10) minutes until to be saturated, and even in this saturated state, a difference occurs between the engine outlet NOx value and the catalyst outlet NOx value $\alpha_1$. When the PM forcible regeneration control is implemented, as shown in FIG. 5, on the other hand, the catalyst outlet NOx value $\alpha_1$ takes approximately three (3) minutes until to be saturated, and in the saturated state, the engine outlet NOx value and the catalyst outlet NOx value $\alpha_1$ are substantially identical. Hence, the effect of the present invention is evident.

Further, the map (FIG. 3) stored in the control ECU 40 is corrected appropriately in accordance with the difference (learned value) $\beta$ between the catalyst outlet NOx value $\alpha_1$ stored in the engine NOx value storage unit 44 as the engine outlet NOx value and the map NOx value (initial value) $\alpha_0$ read from the map (FIG. 3) on the basis of the operating state of the diesel engine 10 upon storage of the catalyst outlet NOx value $\alpha_1$. Thereafter, the control ECU 40 performs basic control such as injection control and fuel injection timing control on the diesel engine 10, forcible regeneration control on the LNT occlusion reduction catalyst 32, and the like on the basis of the corrected map.

Hence, deterioration of the NOx value of the exhaust gas generated by the diesel engine 10 and discharged from the exhaust gas processing device 30 due to catalyst deterioration and the like can be suppressed effectively.

Note that the present invention is not limited to the embodiment described above and may be amended appropriately within a scope that does not depart from the spirit of the present invention.

Figure 7:
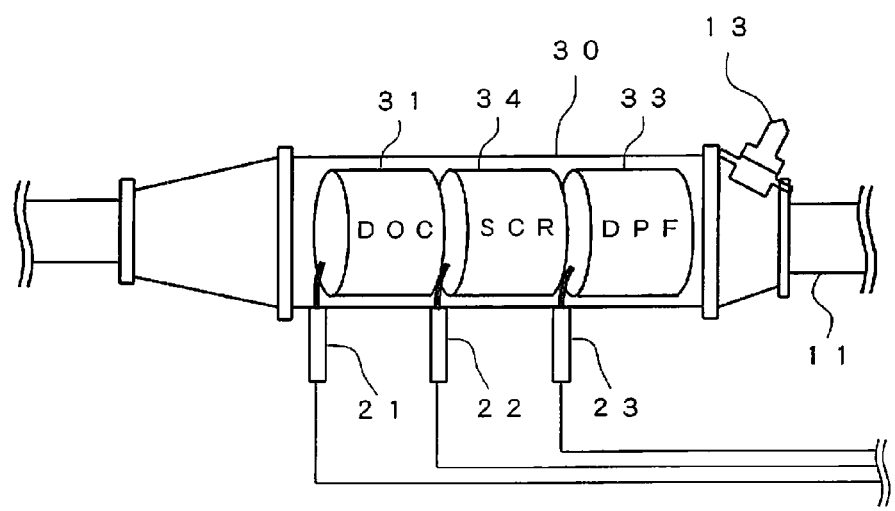
FIG. 7 is a block diagram showing a configuration of an exhaust gas processing device according to another embodiment.

For example, in the above embodiment, the LNT occlusion reduction catalyst 32 is included in the exhaust gas processing device 30, but as shown in FIG. 7, an SCR selective reduction catalyst 34 may be provided in place of the LNT occlusion reduction catalyst 32. In this case, an ammonia-based solution injection device (not shown) may be provided on the upstream side of the exhaust gas processing device 30, and the NOx in the exhaust gas may be purified by causing the NOx to react with ammonia selectively.

Further, in the above embodiment, an oxidation catalyst is not carried on the DPF 33, but an oxidation catalyst may be carried on the DPF 33.

Furthermore, in the above embodiment, the catalyst and the filters 31, 32, and 33 constituting the exhaust gas processing device 30 are provided in order of the DOC 31, the LNT occlusion reduction catalyst 32, and the DPF 33 from the upstream side. However, these components do not necessarily have to be disposed in this order, and the order may be changed appropriately.

Although the invention above has been described in connection with preferred embodiments of the invention, it will be evident for a person skilled in the art that several modifications are conceivable without departing from the invention as defined by the following claims.

The invention claimed is:

1. An exhaust gas purification device comprising:
   an exhaust gas processing device provided in an exhaust passage of an internal combustion engine;
   an in-exhaust pipe fuel injector provided in said exhaust passage on an upstream side of said exhaust gas processing device in order to supply fuel to said exhaust gas processing device;
   a NOx detecting sensor provided on a downstream side of said exhaust gas processing device;
   a temperature detecting sensor for detecting a temperature in said gas processing device; and
   an engine control unit configured to control combustion in said internal combustion engine;
   wherein said engine control unit is further configured to cause said in-exhaust pipe fuel injector to supply said fuel to said exhaust gas processing device to burn and remove PM trapped in said exhaust gas processing device;
   said engine control unit is further configured to store a detection value from said NOx detecting sensor as a NOx value at said outlet of said internal combustion engine when a fixed time has elapsed, an amount of variation in a temperature detection value from said temperature detecting sensor that has remained at or below a predetermined value continuously for said fixed time, and an amount of variation in said detection value from said NOx detecting sensor that has remained at or below a predetermined value continuously for said fixed time after said fuel has been supplied to said exhaust gas processing device from said in-exhaust pipe fuel injector; and
   said engine control unit is further configured to control combustion in said internal combustion engine based on said NOx value.

2. The exhaust gas purification device according to claim 1, wherein
   said engine control unit further comprises a map illustrating a fuel injection amount to be injected relative to a NOx value generated in accordance with said operating state of said internal combustion engine, and
   said engine control unit is further configured to correct said NOx value on said map on the basis of a difference between said NOx value on said map and said detection value from said NOx detecting sensor stored as said NOx value at said outlet of said internal combustion engine.

3. The exhaust gas purification device according claim 1, wherein said exhaust gas processing device comprises an oxidation catalyst, an LNT occlusion reduction catalyst, and a DPF.

4. The exhaust gas purification device according to claim 1, wherein
said engine control unit further comprises a map illustrating a fuel injection amount to be injected relative to a NOx value generated in accordance with said operating state of said internal combustion engine, and
said engine control unit is further configured to correct said NOx value on said map on the basis of a difference between said NOx value on said map and said detection value from said NOx detecting sensor stored as said NOx value at said outlet of said internal combustion engine.

5. The exhaust gas purification device according to claim 4, wherein said exhaust gas processing device comprises an oxidation catalyst, an LNT occlusion reduction catalyst, and a DPF.

6. The exhaust gas purification device according to claim 1, wherein said exhaust gas processing device comprises an oxidation catalyst, an LNT occlusion reduction catalyst, and a DPF.

7. A control method for an exhaust gas purification device having an exhaust gas processing device provided in an exhaust passage of an internal combustion engine and comprising a temperature detecting sensor, an in-exhaust pipe fuel injector provided in said exhaust passage on an upstream side of said exhaust gas processing device in order to supply fuel to said exhaust gas processing device, a NOx detecting sensor provided on a downstream side of said exhaust gas processing device, and an engine control unit that controls combustion in said internal combustion engine on the basis of an operating state of said internal combustion engine, the method comprising the steps of:
said engine control unit causing said in-exhaust pipe fuel injector to supply said fuel to said exhaust gas processing device to burn and remove PM trapped in said exhaust gas processing device;
the NOx detecting sensor detecting a value of NOx on a downstream side of said exhaust gas processing device;
the temperature detecting sensor detecting a temperature in said exhaust gas processing device;
said engine control unit storing said detection value from said NOx detecting sensor as a NOx value at said outlet of said internal combustion engine when a fixed time has elapsed, an amount of variation in a temperature detection value from said temperature detecting sensor has remained at or below a predetermined value continuously for said fixed time, and an amount of variation in said detection value from said NOx detecting sensor that has remained at or below a predetermined value continuously for said fixed time after said fuel has been supplied to said exhaust gas processing device from said in-exhaust pipe fuel injector; and
said engine control unit controlling combustion in said internal combustion engine based on said NOx value.

8. The control method for an exhaust gas purification device according to claim 7, wherein
said engine control unit further comprises a map illustrating a fuel injection amount to be injected relative to a NOx value generated in accordance with said operating state of said internal combustion engine, and
said engine control unit corrects said NOx value on said map on the basis of a difference between said NOx value on said map and said detection value from said NOx detecting sensor stored as said NOx value at said outlet of said internal combustion engine.

9. The control method for an exhaust gas purification device according to claim 7, wherein said exhaust gas processing device comprises an oxidation catalyst, an LNT occlusion reduction catalyst, and a DPF.

10. The control method for an exhaust gas purification device according to claim 7, wherein
said engine control unit further comprises a map illustrating a fuel injection amount to be injected relative to a NOx value generated in accordance with said operating state of said internal combustion engine, and
said engine control unit corrects said NOx value on said map on the basis of a difference between said NOx value on said map and said detection value from said NOx detecting sensor stored as said NOx value at said outlet of said internal combustion engine.

11. The control method for an exhaust gas purification device according to claim 10, wherein said exhaust gas processing device comprises an oxidation catalyst, an LNT occlusion reduction catalyst, and a DPF.

12. The control method for an exhaust gas purification device according to claim 7, wherein said exhaust gas processing device comprises an oxidation catalyst, an LNT occlusion reduction catalyst, and a DPF.

* * * * *